United States Patent
Lee et al.

(10) Patent No.: US 10,869,360 B2
(45) Date of Patent: Dec. 15, 2020

(54) METHOD AND DEVICE FOR TRANSMITTING DATA UNIT

(71) Applicant: LG Electronics Inc., Seoul (KR)

(72) Inventors: Gyeongcheol Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/100,864

(22) Filed: Aug. 10, 2018

(65) Prior Publication Data

US 2019/0053326 A1    Feb. 14, 2019

Related U.S. Application Data

(60) Provisional application No. 62/543,996, filed on Aug. 11, 2017.

(51) Int. Cl.
| | |
|---|---|
| H04L 1/18 | (2006.01) |
| H04L 29/06 | (2006.01) |
| H04W 28/06 | (2009.01) |
| H04W 76/36 | (2018.01) |
| H04L 1/00 | (2006.01) |

(Continued)

(52) U.S. Cl.
CPC .......... *H04W 76/36* (2018.02); *H04L 1/0007* (2013.01); *H04L 1/188* (2013.01); *H04L 1/1841* (2013.01); *H04W 4/70* (2018.02); *H04W 72/0406* (2013.01); *H04W 76/27* (2018.02); *H04W 80/02* (2013.01); *H04W 28/06* (2013.01)

(58) Field of Classification Search
CPC ..... H04L 47/32; H04L 69/324; H04L 1/1883; H04L 69/04; H04L 1/1874; H04L 1/1832; H04L 47/34; H04L 1/187; H04L 47/14; H04L 69/32; H04W 28/04; H04W 80/02
See application file for complete search history.

(56) References Cited

U.S. PATENT DOCUMENTS 7,539,137 B2 * 5/2009 Yi .................... H04L 1/1877 370/232
8,004,986 B2 * 8/2011 Yi .................... H04L 1/1877 370/232

(Continued)

FOREIGN PATENT DOCUMENTS

| EP | 2830352 | 1/2015 |
|---|---|---|
| EP | 3179770 | 6/2017 |

(Continued)

OTHER PUBLICATIONS

International Search Report in International Application No. PCT/KR2018/009130, dated Dec. 27, 2018, 23 pages.

(Continued)

*Primary Examiner* — Sai Aung
(74) *Attorney, Agent, or Firm* — Fish & Richardson P.C.

(57) ABSTRACT

A radio link control (RLC) entity of a transmitting device receives a first RLC service data unit (SDU) from an upper layer of the transmitting device. If the RLC entity receives, from the upper layer, a discard indication to discard the first RLC SDU, the RLC entity checks whether the first RLC SDU has been submitted to a lower layer of the transmitting device. The RLC entity discards the first RLC SDU if neither the first RLC SDU nor a segment of the first RLC SDU has been submitted to the lower layer.

18 Claims, 10 Drawing Sheets

(51) Int. Cl.
*H04W 4/70* (2018.01)
*H04W 76/27* (2018.01)
*H04W 72/04* (2009.01)
*H04W 80/02* (2009.01)

(56) References Cited

U.S. PATENT DOCUMENTS

| | | | |
|---|---|---|---|
| 8,170,060 B2 | 5/2012 | Yi et al. | |
| 8,514,708 B2 * | 8/2013 | Yi | H04L 1/1877 370/232 |
| 8,625,503 B2 * | 1/2014 | Chun | H04L 1/1877 370/329 |
| 8,855,047 B2 * | 10/2014 | Sammour | H04L 1/1874 370/328 |
| 2004/0184437 A1 * | 9/2004 | Lee | H04L 1/1685 370/349 |
| 2009/0175173 A1 * | 7/2009 | Kim | H04L 1/165 370/241 |
| 2009/0207786 A1 | 8/2009 | Yi et al. | |
| 2010/0135202 A1 * | 6/2010 | Chun | H04L 1/1877 370/328 |
| 2010/0136963 A1 | 6/2010 | Yi et al. | |
| 2011/0199998 A1 * | 8/2011 | Yi | H04L 1/1877 370/329 |
| 2014/0085932 A1 | 3/2014 | Jeong et al. | |
| 2015/0063373 A1 * | 3/2015 | Savaglio | H04W 88/08 370/466 |
| 2016/0098574 A1 | 4/2016 | Bargagni | |

FOREIGN PATENT DOCUMENTS

| | | | | |
|---|---|---|---|---|
| KR | 20070033297 A | * | 3/2007 | ............. H04L 1/187 |
| KR | 20100066575 A | * | 6/2010 | ........... H04L 1/1874 |
| RU | 2434347 | | 11/2011 | |

OTHER PUBLICATIONS

Extended European Search Report in European Application No. 18826476.6, dated Feb. 19, 2020, 10 pages.
Fujitsu, "MAC PDU format and PDCP discard," R2-1700116, 3GPP TSG-RAN WG2 NR Ad Hoc, Spokane, Washington, USA, dated Jan. 17-19, 2017, 4 pages, XP051210702.
LG Electronics Inc., "Discussion on RLC Discard," R2-074242, 3GPP TSG-RAN WG2 #59bis, Shanghai, China, dated Oct. 8-12, 2007, 4 pages, XP0501136857.
Samsung, "PDCP discard timer operation tor NR" R2-1703581, 3GPP TSG-RAN WG2 Meeting #97bis, Spokane, USA, dated Apr. 3-7, 2017, 2 pages, XP051245420.
Russian Notice of Allowance in Russian Application No. 2020107301, dated Jun. 17, 2020, 23 pages (with English translation).

* cited by examiner (a) Control-Plane Protocol Stack (b) User-Plane Protocol Stack

METHOD AND DEVICE FOR TRANSMITTING DATA UNIT

CROSS-REFERENCE TO RELATED APPLICATIONS

This application claims the benefit of U.S. Provisional Application Ser. No. 62/543,996, filed on Aug. 11, 2017, the contents of which are all hereby incorporated by reference herein in their entirety.

TECHNICAL FIELD

The present invention relates to a wireless communication system, and more particularly, to a method for transmitting a data unit and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

SUMMARY

In an aspect of the present invention, provided herein is a method for transmitting, by a transmitting device, data units in wireless communication system. The method comprises: receiving, at a radio link control (RLC) entity from an upper layer, a first RLC service data unit (SDU); receiving, at the RLC entity from the upper layer, a discard indication to discard the first RLC SDU; checking, at the RLC entity, whether the first RLC SDU has been submitted to a lower layer; and discarding, at the RLC entity, the first RLC SDU if neither the first RLC SDU nor a segment of the first RLC SDU has been submitted to the lower layer.

In another aspect of the present invention, provided herein is a transmitting device for transmitting data units in wireless communication system. The transmitting device comprises: a transceiver, and a processor configured to control the transceiver. The processor is configured to: receive, at a radio link control (RLC) entity from an upper layer, a first RLC service data unit (SDU); receive, at the RLC entity from the upper layer, a discard indication to discard the first RLC SDU; check, at the RLC entity, whether the first RLC SDU has been submitted to a lower layer; and discard, at the RLC entity, the first RLC SDU if neither the first RLC SDU nor a segment of the first RLC SDU has been submitted to the lower layer.

In each aspect of the present invention, the first RLC SDU may be discarded if neither the first RLC SDU nor a segment of the first RLC SDU has been submitted to the lower layer, even if the first RLC SDU or a segment of the first RLC SDU has been included in an RLC protocol data unit (PDU).

In each aspect of the present invention, the first RLC SDU may not be discarded if the first RLC SDU or a segment of the first RLC SDU has been submitted to the lower layer.

In each aspect of the present invention, a remaining segment of the first RLC SDU may be submitted to the lower layer if there is the remaining segment of the first RLC SDU at the RLC entity.

In each aspect of the present invention, the lower layer may transmit a lower layer data unit containing the first RLC SDU or the segment of the first RLC SDU.

In each aspect of the present invention, remaining RLC SDUs are re-associated with RLC sequence numbers (SNs) consecutively, at the RLC entity, starting from a lowest RLC SN among RLC SNs of discarded RLC SDUs.

The above technical solutions are merely some parts of the embodiments of the present invention and various embodiments into which the technical features of the present invention are incorporated can be derived and understood by persons skilled in the art from the following detailed description of the present invention.

According to the present invention, radio communication signals can be efficiently transmitted/received. Therefore, overall throughput of a radio communication system can be improved.

According to an embodiment of the present invention, delay/latency occurring during communication between a user equipment and a BS may be reduced.

Also, signals in a new radio access technology system can be transmitted/received effectively.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

DETAILED DESCRIPTION

Figure 1:
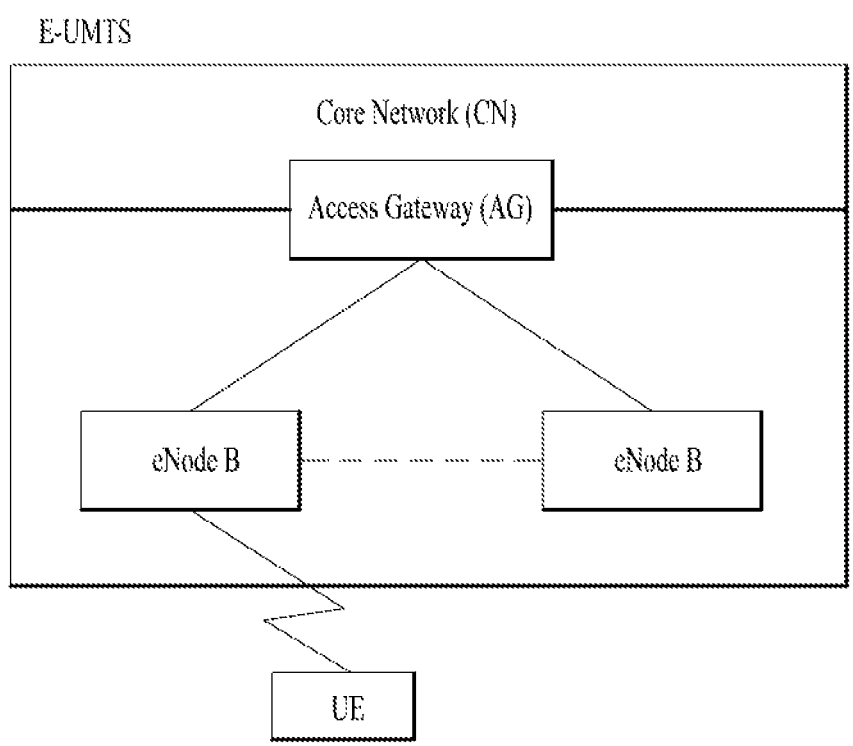
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based wireless communication system. However, the technical features of the present invention are not limited thereto. For example, although the following detailed description is given based on a mobile communication system corresponding to a 3GPP based system, aspects of the present invention that are not limited to 3GPP based system are applicable to other mobile communication systems.

For example, the present invention is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

Meanwhile, a 3GPP based system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the recent 3GPP based wireless communication standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency may be a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity (DC) operation the term "special Cell" refers to the PCell of the master cell group (MCG) or the PSCell of the secondary cell group (SCG), otherwise the term Special Cell refers to the PCell. The MCG is a group of serving cells associated with a master BS which terminates at least S1-MME, and the SCG is a group of serving cells associated with a secondary BS that is providing additional radio resources for the UE but is not the master BS. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

Figure 2:
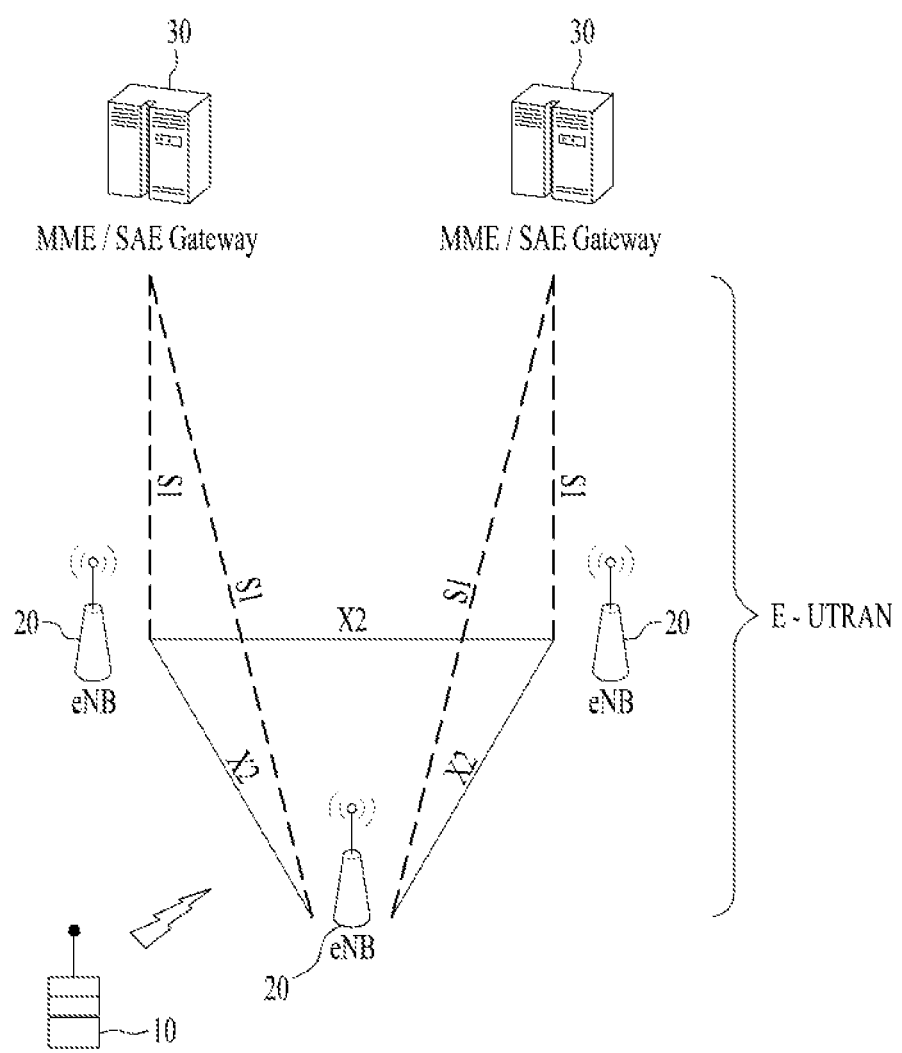
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

Figure 3:
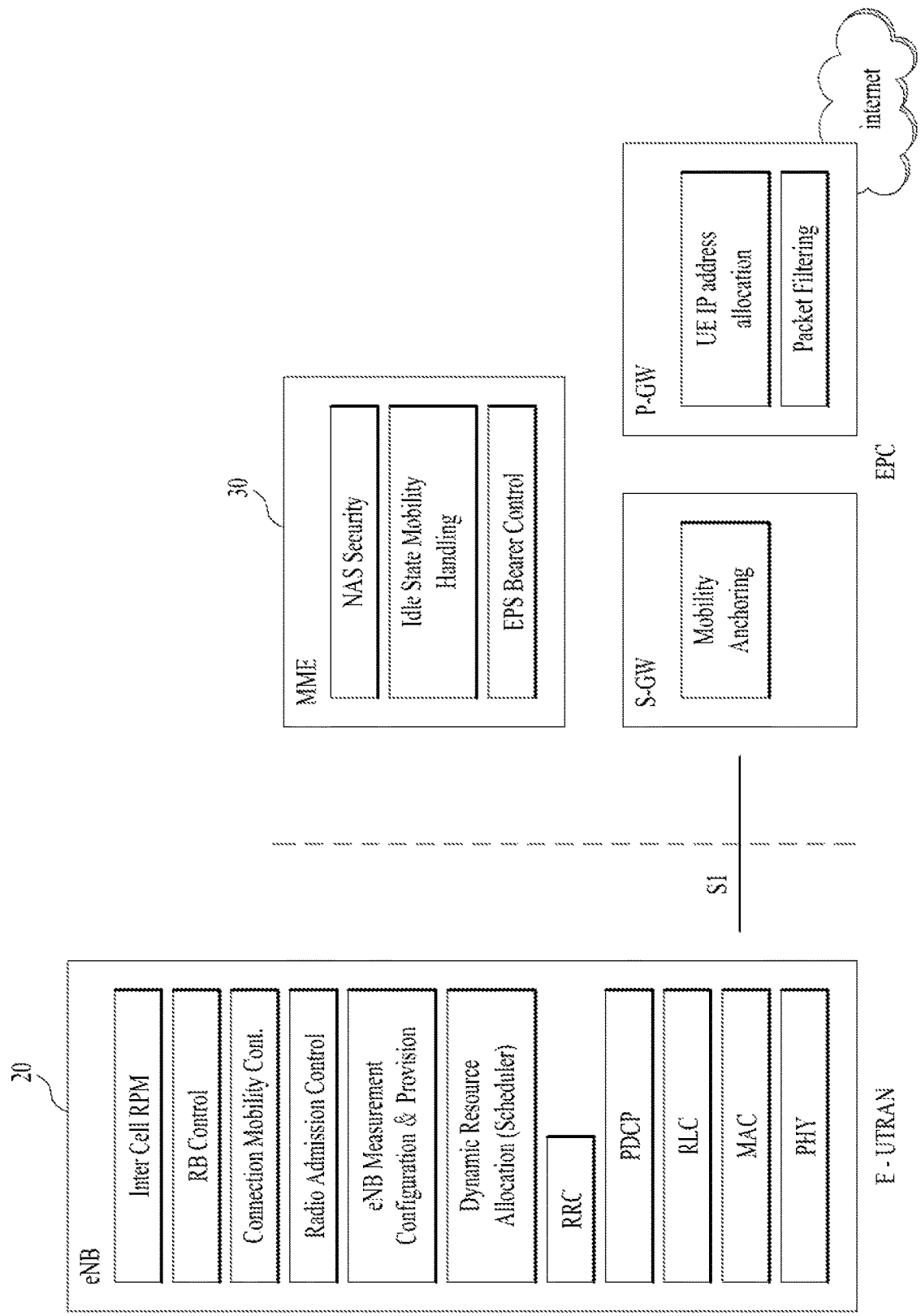
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
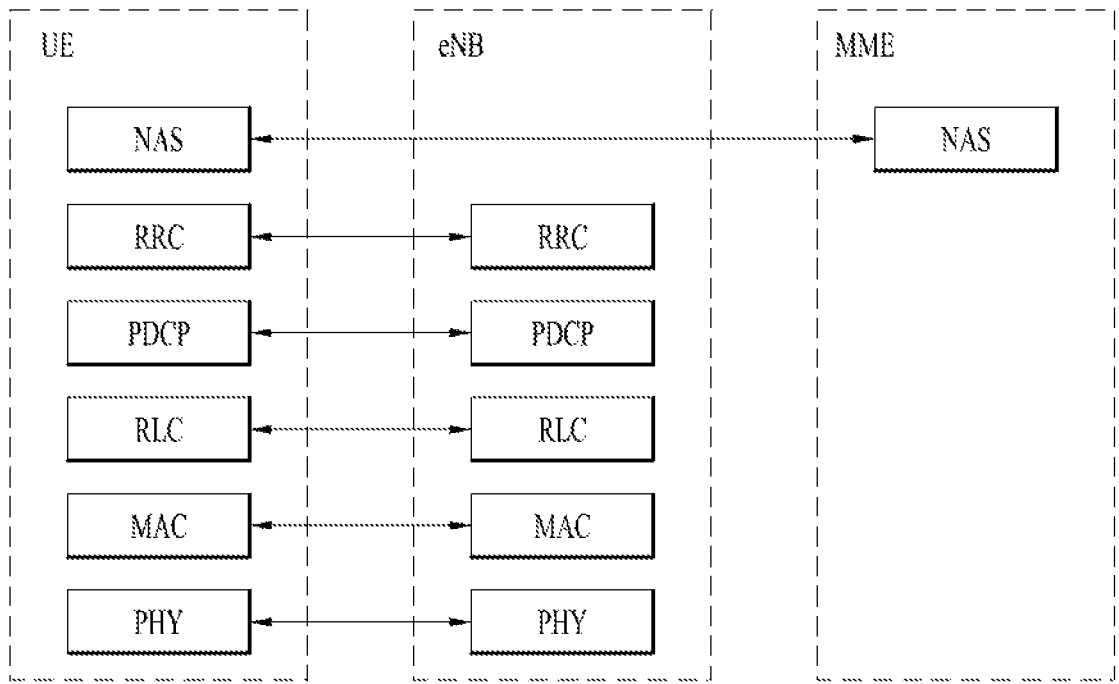
FIG. 4 is a diagram showing a control plane and a user plane of a radio interface protocol between a UE and an E-UTRAN based on a 3GPP radio access network standard.
Figure 4:
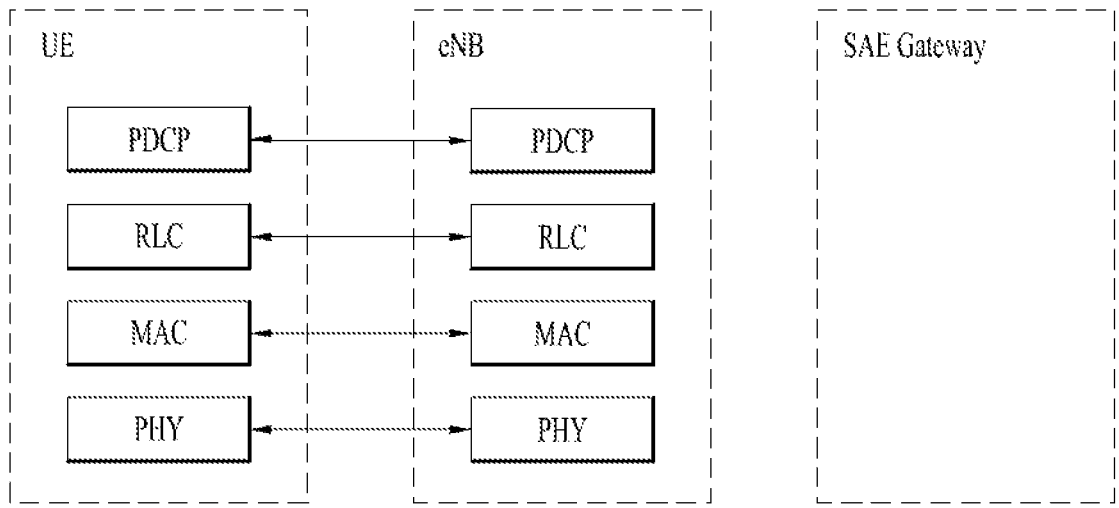

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by means of dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations.

The main services and functions of the PDCP sublayer for the user plane include: header compression and decompression (ROHC only); transfer of user data; in-sequence delivery of upper layer PDUs at PDCP re-establishment procedure for RLC AM; for split bearers in DC and LWA bearers (only support for RLC AM), PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

In LTE, one cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
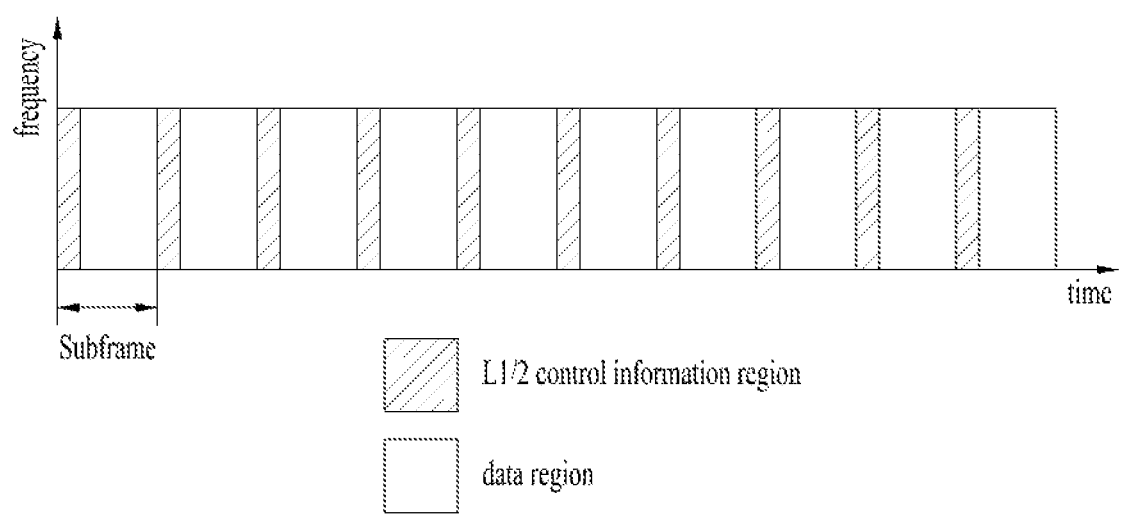
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to an RNTI means that the PDCCH is cyclic redundancy check masked (CRC-masked) with the RNTI. A UE may attempt to decode a PDCCH using the certain RNTI if the UE is monitoring a PDCCH addressed to the certain RNTI.

Figure 6:
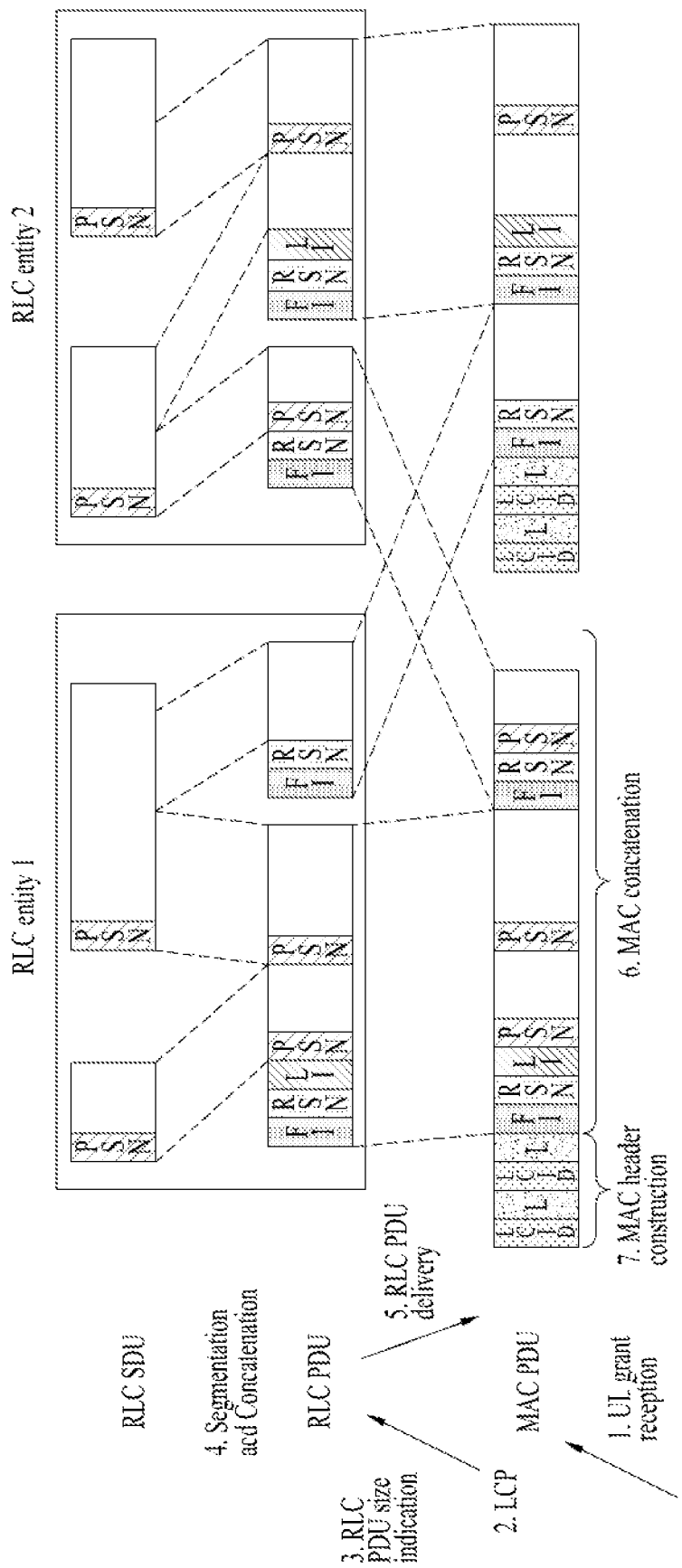
FIG. 6 illustrates a data flow example at a transmitting device in the LTE/LTE-A system.

FIG. 6 illustrates a data flow example at a transmitting device in the LTE/LTE-A system. Especially, FIG. 6 shows an uplink (UL) data flow example where a UE is a transmitting side and a BS or network is a receiving side. A downlink (DL) data flow is similar to the UL data flow, except that a UE should receive a UL grant used for UL MAC PDU transmission while a BS does not have to receive a DL grant used for DL MAC PDU transmission but can allocate it for itself.

Referring to FIG. 6, in LTE, a MAC PDU construction process at a UE starts when a UL grant is received, as follows.

1. The UE receives a UL grant from an eNB.

2. The MAC entity performs Logical Channel Prioritization (LCP) procedure to determine the RLC PDU size for each RLC entity.

3. The MAC entity indicates the determined RLC PDU size to each RLC entity.

4. Each RLC entity performs segmentation and/or concatenation of RLC SDUs to construct a RLC PDU. RLC SDUs are received at an RLC entity from upper layer (e.g. PDCP entity). Each PDCP PDU submitted from a PDCP entity to an RLC entity is an RLC SDU at the RLC entity.

When a transmitting UM RLC entity forms UMD PDUs from RLC SDUs, it segments and/or concatenates the RLC SDUs so that the UMD PDUs fit within the total size of RLC PDU(s) indicated by lower layer at the particular transmission opportunity notified by lower layer (e.g. MAC entity); and includes relevant RLC headers in the UMD PDU. When the transmitting side of an AM RLC entity forms AMD PDUs from RLC SDUs, it segments and/or concatenates the RLC SDUs so that the AMD PDUs fit within the total size of RLC PDU(s) indicated by lower layer at the particular transmission opportunity notified by lower layer (e.g. MAC entity). The transmitting side of an AM RLC entity supports retransmission of RLC data PDUs (ARQ). If the RLC data PDU to be retransmitted does not fit within the total size of RLC PDU(s) indicated by lower layer (e.g. MAC entity) at the particular transmission opportunity notified by the lower layer, the transmitting side of an AM RLC entity can re-segment the RLC data PDU into AMD PDU segments, and the number of re-segmentation is not limited. When the transmitting side of an AM RLC entity forms AMD PDUs from RLC SDUs received from upper layer (e.g. PDCP entity) or AMD PDU segments from RLC data PDUs to be retransmitted, it includes relevant RLC headers in the RLC data PDU.

For each RLC PDU, Framing Info (FI) and RLC Sequence Number (RSN) are mandatorily present in the corresponding RLC header. The Length Indicator (LI) is included in the corresponding RLC header each time two RLC SDUs (segments) are concatenated.

5. Each RLC entity delivers the constructed RLC PDU to the MAC entity.

When submitting a new TMD PDU to lower layer (e.g. MAC entity), the transmitting TM RLC entity submits a RLC SDU without any modification to the lower layer.

When delivering a new UMD PDU to lower layer (e.g. MAC entity), the transmitting UM RLC entity sets the sequence number (SN) of the UMD PDU to VT(US), and then increments VT(US) by one, where the state variable VT(US) holds the value of the SN to be assigned for the next newly generated UMD PDU, and VT(US) is initially set to 0 and updated whenever the transmitting UM RLC entity delivers an UMD PDU with SN=VT(US).

The transmitting side of an AM RLC entity shall prioritize transmission of RLC control PDUs over RLC data PDUs. The transmitting side of an AM RLC entity shall prioritize retransmission of RLC data PDUs over transmission of new AMD PDUs. The transmitting side of an AM RLC entity shall maintain a transmitting window, and it does not deliver to lower layer any RLC data PDU whose SN falls outside of the transmitting window. When delivering a new AMD PDU to lower layer (e.g. MAC entity), the transmitting side of an AM RLC entity sets the SN of the AMD PDU to VT(S), and then increment VT(S) by one, where the state variable VT(S) holds the value of the SN to be assigned for the next newly generated AMD PDU, and VT(S) is initially set to 0 and updated whenever the transmitting side of an AM RLC entity delivers an AMD PDU with SN=VT(S). The transmitting side of an AM RLC entity can receive a positive acknowledgement (confirmation of successful reception by its peer AM RLC entity) for a RLC data PDU by STATUS PDU from its peer AM RLC entity. If positive acknowledgements have been received for all AMD PDUs associated with a transmitted RLC SDU, the transmitting side of an AM RLC entity sends an indication to the upper layers of successful delivery of the RLC SDU.

6. The MAC entity concatenates RLC PDUs received from multiple RLC entities.

7. The MAC entity sets the value of MAC subheader for each MAC SDU, and collects all MAC subheaders in front of the MAC PDU to form a MAC header.

Referring to 3GPP TS 36.323, at reception of a PDCP SDU from upper layers, a transmitting PDCP entity (i.e. PDCP entity at a transmitting side) starts the discardTimer associated with this PDCP SDU (if configured). For a PDCP SDU received from upper layers, the transmitting PDCP entity associates the PDCP SN corresponding to Next_PDCP_TX_SN to this PDCP SDU, where the variable Next_PDCP_TX_SN indicates the PDCP SN of the next PDCP SDU for a given PDCP entity and it is set to 0 at establishment of the PDCP entity. The transmitting PDCP entity performs header compression of the PDCP SDU (if configured), and integrity protection (if applicable) and ciphering (if applicable) to generate PDCP Data PDU. The transmitting PDCP entity submits the resulting PDCP Data PDU to lower layer (e.g. RLC entity). The expiry of the discardTimer associated with a PDCP SDU in the transmitting PDCP entity (e.g. PDCP entity of the UE) may indicate that the time for meaningful transmission of the PDCP SDU has expired. For example, the discardTimer for a data radio bearer (DRB) may be configured to be short if data for the data radio bearer (DRB) is meaningful only when it reaches the receiving side in a short time, whereas the discardTimer for the DRB may be configured to be long if the data for the DRB is not time sensitive or is important data to be provided to the receiving side regardless of the time. The discardTimer for the DRB may be configured by the RRC. Therefore, when discardTimer for a PDCP SDU expires, the PDCP entity of the LTE discards the PDCP SDU and the corresponding PDCP PDU because it no longer needs to keep the PDCP SDU in the PDCP buffer. Besides, if the PDCP SDU has been successfully delivered to the receiving side, the PDCP SDU does not have to be transmitted any more. Therefore, the successful delivery of the PDCP SDU is confirmed by PDCP status report or LWA status report, the transmission PDCP entity of the LTE discards the PDCP SDU along with the corresponding PDCP PDU. If a PDCP PDU to be discarded has already been submitted to the RLC layer, the PDCP PDU does not remain in the PDCP layer any more but the RLC SDU of the PDCP PDU may remain in the RLC layer. Therefore, the PDCP layer indicates the RLC layer to discard a particular RLC PDU associated with the PDCP PDU to be discarded. When indicated from upper layer (i.e. PDCP) to discard a particular RLC SDU, the transmitting side of an AM RLC entity or the transmitting UM RLC entity discards the indicated RLC SDU if no segment of the RLC SDU has been mapped to a RLC data PDU yet.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signalling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by means of dynamic scheduling; priority handling between logical channels of one UE by means of logical channel prioritization; and padding. A single MAC entity can support one or multiple numerologies and/or transmission timings, and mapping restrictions in logical channel prioritization controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression (ROHC only); transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

Figure 7:
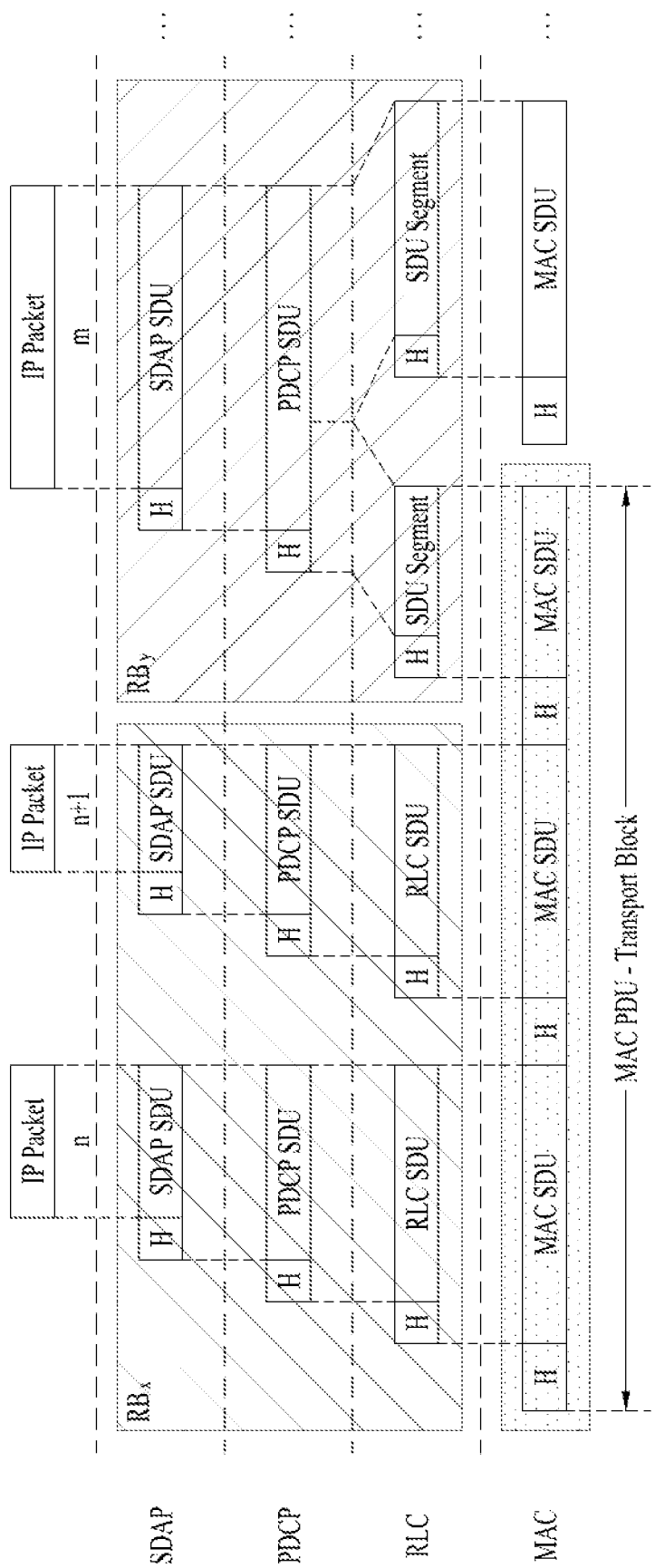
FIG. 7 illustrates a data flow example at a transmitting device in the NR system.

FIG. 7 illustrates a data flow example at a transmitting device in the NR system.

In FIG. 7, an RB denotes a radio bearer. Referring to FIG. 7, a transport block is generated by MAC by concatenating two RLC PDUs from $RB_x$ and one RLC PDU from $RB_y$. In FIG. 7, the two RLC PDUs from $RB_x$ each corresponds to one IP packet (n and n+1) while the RLC PDU from $RB_y$ is a segment of an IP packet (m). In NR, a RLC SDU segment can be located in the beginning part of a MAC PDU and/or in the ending part of the MAC PDU.

In NR, segmentation is always enabled for RLC-AM and RLC-UM. A RLC SDU for UM and AM can be associated with only one RLC SN, i.e., the byte segments from a RLC SDU can be associated with the same RLC SN.

As described referring to FIG. 6, in LTE, when given a RLC size from the MAC layer, the RLC entity constructs a RLC data PDU by including one or more RLC SDUs or RLC SDU segments. Therefore, when indicated from upper layer (i.e., PDCP) to discard a particular RLC SDU, it is difficult for the RLC entity to discard the RLC SDU if it is already included in the RLC data PDU. This is because, in LTE, a RLC PDU containing RLC SDU(s) is generated when a RLC PDU size is given from the MAC layer, and the generated RLC PDU is immediately submitted to the MAC layer. For this reason, in LTE, the RLC entity discards the RLC SDU only if no segment of the RLC SDU has been included in a RLC data PDU yet. If the RLC SDU or any segment of the RLC SDU is already mapped on to an RLC data PDU, the RLC entity does not discard the RLC SDU but keeps transmitting it. As the discard timer (discardTimer) of the RLC SDU has been already expired, transmission of the RLC SDU is useless behavior (because it will be discarded in the receiver side anyway), but this behavior is adopted in LTE due to the complexity of reconstruction of RLC data PDU.

In NR, however, the RLC entity is allowed to construct RLC data PDUs even without indication of a RLC size from the MAC layer. In other words, pre-construction of RLC data PDU is allowed in NR. How many RLC data PDUs are pre-constructed is left up to UE implementation. In this condition, if the LTE discard rule is applied to the NR as it is, there may be huge waste of radio resources if the RLC entity pre-constructs lots of RLC data PDUs. Therefore, the RLC discard rule should be changed such that the RLC entity can discard RLC SDUs even if they are already mapped to RLC data PDUs (i.e. even if they are already included in RLC data PDUs).

In the present invention, when the transmitting RLC entity receives a discard indication from upper layer (i.e., PDCP) to discard a RLC SDU, the transmitting RLC entity discards the RLC SDU only if no segment of the RLC SDU has been submitted to the lower layer (i.e. MAC). In other words, when indicated from a PDCP entity to discard a particular RLC SDU, the transmitting RLC entity discards the indicated RLC SDU if neither the RLC SDU nor a segment of the RLC SDU has been submitted to the MAC entity.

In the present invention, the transmitting RLC entity can be a transmitting side of an AM RLC entity or a transmitting UM RLC entity or a transmitting TM RLC entity.

When the transmitting RLC entity receives an indication from upper layer (i.e., PDCP) to discard a RLC SDU, the transmitting RLC entity of the present invention checks whether the indicated RLC SDU is submitted to lower layer. The transmitting RLC entity discards the indicated RLC SDU if the indicated RLC SDU or any segment of the indicated RLC SDU has not been submitted to the lower layer (e.g. MAC), even if there is a segment of the indicated RLC SDU which is included in a RLC data PDU. In other words, the transmitting RLC entity discards the indicated RLC SDU if neither the indicated RLC SDU nor any segment thereof has been submitted to the lower layer, even if any segment of the indicated RLC SDU has been mapped to an RLC data PDU (i.e. even if any segment of the indicated RLC SDU has been included in an RLC data PDU). The transmitting RLC entity does not discard the indicated RLC SDU and keeps transmitting the indicated RLC SDU if the indicated RLC SDU or any segment of the indicated RLC SDU has been submitted to the lower. Here, keeping transmitting the indicated RLC SDU may mean the following:

- For TM and UM RLC, the RLC entity submits the indicated RLC SDU or all (remaining) segments of the indicated RLC SDU to lower layer; and/or
- For AM RLC, the RLC entity performs retransmission of the indicated RLC SDU until the indicated RLC SDU is successfully received by the peer RLC entity.

If an SN gap occurs when a transmitting RLC entity discards RLC SDUs, its peer RLC entity could misjudge that RLC SDUs with SNs corresponding to the SN gap are missing. Especially, the receiving side of the AM RLC entity would request retransmission of the discarded RLC SDUs based on the SN gap. For the purpose of preventing this problem, the present invention proposes the followings. When the transmitting RLC entity discards the indicated RLC SDU, the transmitting RLC entity reassigns RLC SN to following RLC SDUs (i.e. RLC SDUs subsequent to the discarded RLC SDU) so that there is no SN gap in the RLC SDUs submitted to a lower layer (e.g. MAC).

Figure 8:
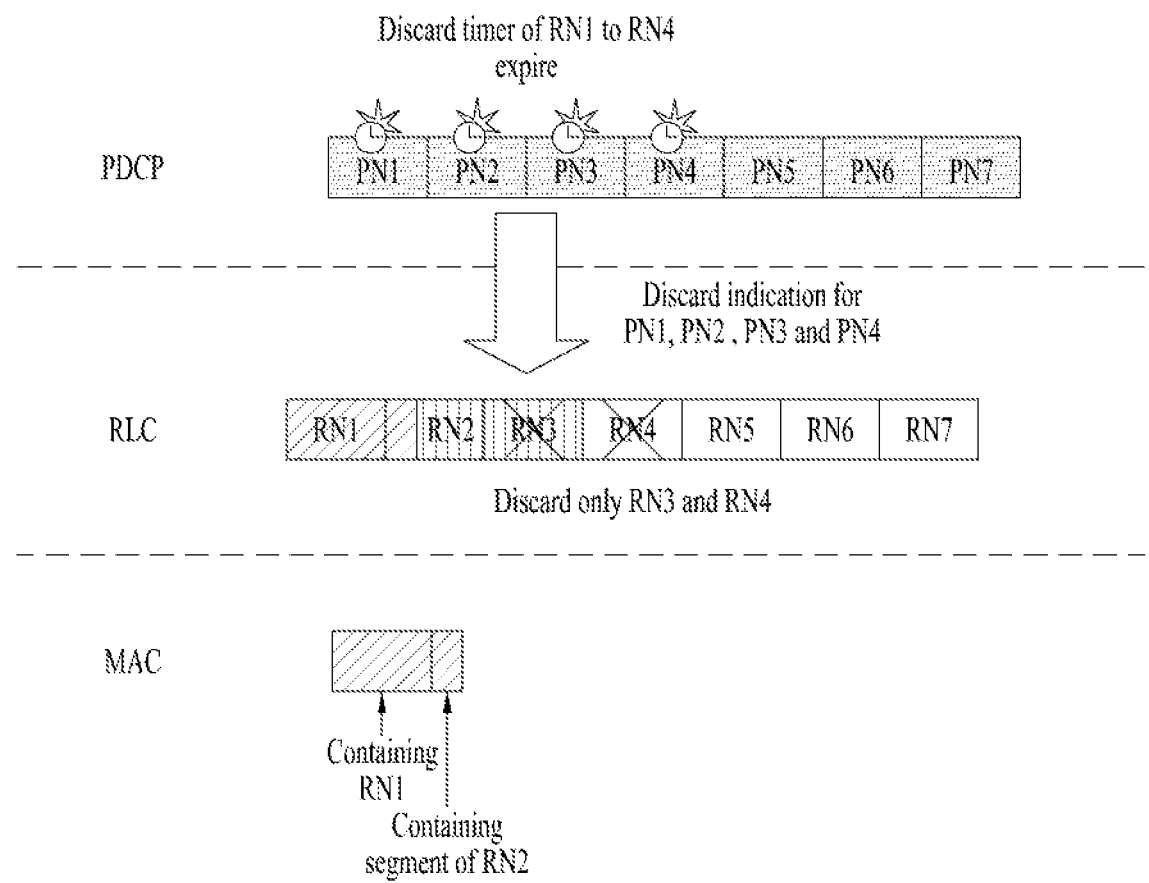
FIG. 8 illustrates an example operation occurring at a transmitting side when the transmitting RLC entity receives a discard indication from PDCP.

FIG. 8 illustrates an example operation occurring at a transmitting side when the transmitting RLC entity receives a discard indication from PDCP. In FIG. 8, "PN" denotes a PDCP SN, and "RN" denotes an RLC SN.

In FIG. 8, the PDCP entity submits PDCP PDUs to the RLC entity in the (ascending) order of their PNs. The RLC entity associates the RLC SDUs (corresponding to PDCP PDUs of PN1~PN7) with RNs, respectively. In the example of FIG. 8, a PN is associated with an RN in the same order of number. In other words, PN1 is associated with RN1, PN2 is associated with RN2, and so on. If the transmitting RLC entity received RLC SDUs, which are associated from RN1 to RN7, and if the transmitting RLC entity receives a discard indication from PDCP to discard from PN1 to PN4, the transmitting RLC entity:

- does not discard the RLC data PDU, which contains the RLC SDU for RN1, because it has been already submitted to the lower layer;
- does not discard the RLC data PDU, which contains the RLC SDU for RN2, because the RLC data PDU, which contains a segment of the RLC SDU for RN2, has been already submitted to the lower layer;
- discards the RLC data PDU, which contains the RLC SDU for RN3, because it has not been submitted to the lower layer yet, even though the RLC SDU for RN3 has been already mapped to or included in the RLC data PDU; and
- discards the RLC SDU for RN4 because it has not been submitted to the lower layer yet.

Figure 9:
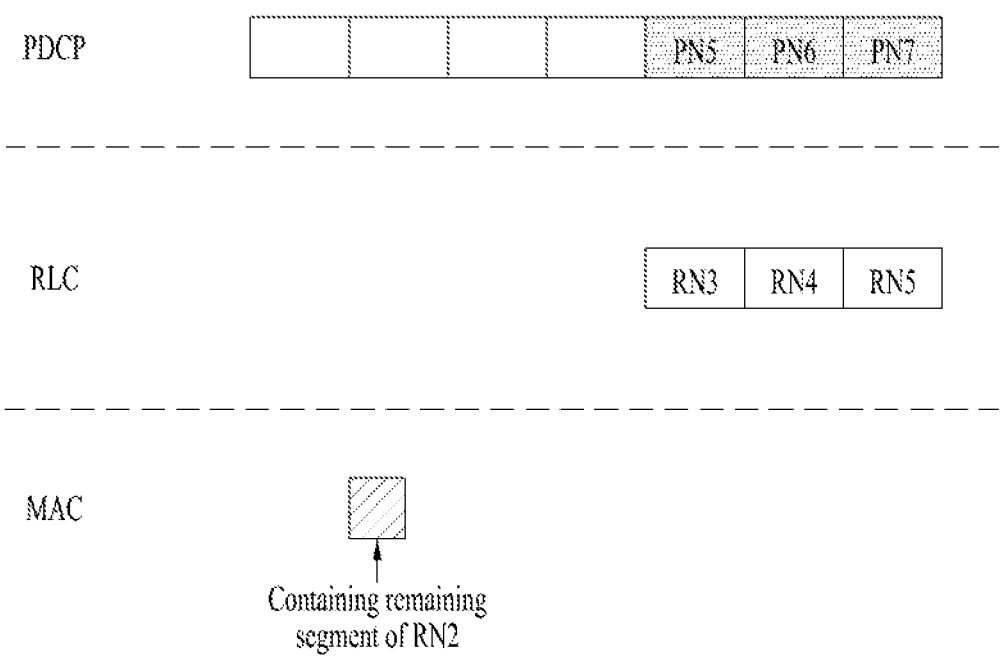
FIG. 9 illustrates an example operation occurring at a transmitting side after a discard indication from PDCP has been handled.

FIG. 9 illustrates an example operation occurring at a transmitting side after a discard indication from PDCP has been handled. In FIG. 9, "PN" denotes a PDCP SN and "RN" denotes an RLC SN.

In FIG. 9, the transmitting RLC entity keeps transmitting the RLC data PDU which contains the remaining segment(s) of RLC SDU for RN2. The transmitting RLC entity reassigns following RLC SDUs from RN5 to RN7 such that there is no SN gap in RLC SDUs submitted to a lower layer (e.g. MAC). In other words, the transmitting RLC entity re-associates remaining RLC SDUs with RLC SNs consecutively starting from the lowest RLC SN among RLC SNs of discarded RLC SDUs. Referring to FIG. 8, since the RLC SDU with RN3 and the RLC SDU with RN4 have been discarded, the lowest RN among RNs of which RLC SDUs have not been submitted from the RLC entity to a lower layer but discarded at the RLC entity is RN3. The RLC entity re-associates RLC SDUs subsequent to the last discarded RLC SDU at the RLC entity with RNs consecutively starting from RN3. Accordingly, referring to FIG. 9, RN 3 is re-associated with PN5, RN4 is re-associated with PN6; and RN5 is re-associated with PN7.

Figure 10:
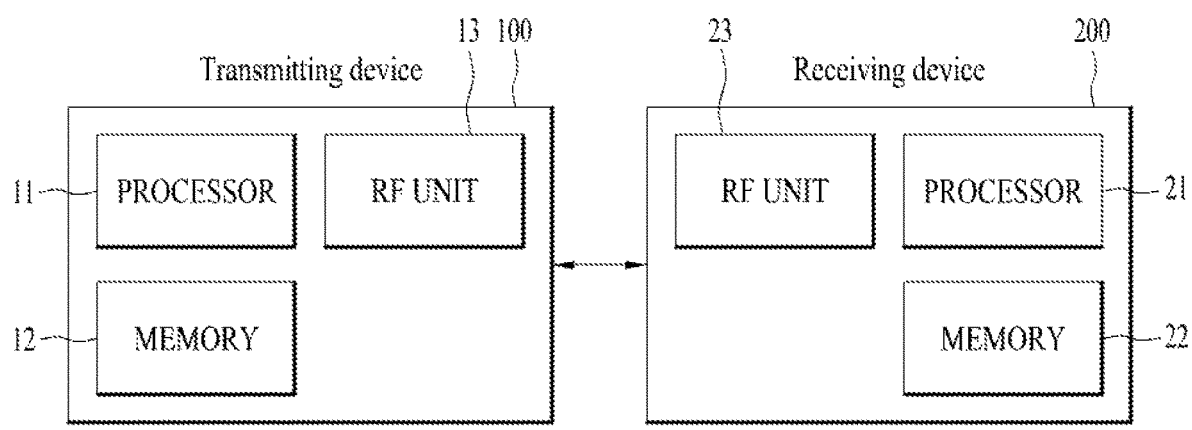
FIG. 10 is a block diagram illustrating elements of a transmitting device 100 and a receiving device 200 for implementing the present invention.

FIG. 10 is a block diagram illustrating elements of a transmitting device 100 and a receiving device 200 for implementing the present invention.

The transmitting device 100 and the receiving device 200 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers. The buffers at each protocol layer (e.g. PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present invention. For example, the operations occurring at the protocol stacks (e.g. PDCP, RLC, MAC and PHY layers) according to the present invention may be performed by the processors 11 and 21. The protocol stacks performing operations of the present invention may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas. The RF units 13 and 23 may be referred to as transceivers.

In the embodiments of the present invention, a UE operates as the transmitting device 100 in UL and as the receiving device 200 in DL. In the embodiments of the present invention, a BS operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively.

The UE processor can be configured to operate according to the present invention, or control the UE transceiver to receive or transmit signals according to the present invention. The BS processor can be configured to operate according to the present invention, or control the BS transceiver to receive or transmit signals according to the present invention.

The processor 11 is configured to receive, at a radio link control (RLC) entity of the transmitting device 100 from an upper layer (e.g. PDCP entity) of the transmitting device 100, a first RLC service data unit (SDU). If there is a discard indication to discard the first RLC SDU at the RLC entity, the processor 11 checks whether the first RLC SDU has been submitted from the RLC entity to a lower layer (e.g. MAC entity). The processor 11 is configured to discard, at the RLC entity, the first RLC SDU if neither the first RLC SDU nor a segment of the first RLC SDU has been submitted to the lower layer. In the present invention, the processor 11 is configured to discard the first RLC SDU if neither the first RLC SDU nor a segment of the first RLC SDU has been submitted to the lower layer, even if the first RLC SDU or a segment of the RLC SDU has been included in an RLC protocol data unit (PDU). In other words, the processor 11 is configured to control an RLC buffer of the RLC entity to discard or flush the first RLC SDU or an RLC PDU containing the first RLC SDU if neither the first RLC SDU nor a segment of the first RLC SDU has been submitted to the lower layer. The processor 11 is configured not to discard the first RLC SDU if the first RLC SDU or a segment of the first RLC SDU has been submitted to the lower layer. In other words, the processor 11 does not control the RLC buffer of the RLC entity to discard or flush the first RLC SDU (or an RLC PDU containing the first RLC SDU if the RLC PDU has been constructed) if the first RLC SDU or a segment of the first RLC SDU has been submitted to the lower layer. The processor 11 may be configured to submit a remaining segment of the first RLC SDU to the lower layer if there is the remaining segment of the first RLC SDU at the RLC entity. The processor 11 may be configured to control the transceiver to transmit a lower layer data unit containing the first RLC SDU or the segment of the first RLC SDU via PHY layer. The lower layer data unit may be a MAC PDU. The processor 11 may be configured to reassign RLC SNs to RLC SDUs subsequent to discarded RLC SDU(s) such that there is no SN gap in RLC SDUs submitted to a lower layer. For example, the processor 11 may be configured to re-associate remaining RLC SDUs with RLC sequence numbers (SNs) consecutively, starting from a lowest RLC SN among RLC SNs of discarded RLC SDUs.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a network node (e.g., BS), a UE, or other devices in a wireless communication system.

The invention claimed is:

1. A method of transmitting, by a transmitting device, data units in a wireless communication system, the method comprising:
   receiving, at a radio link control (RLC) entity of a protocol stack of the transmitting device from an upper layer of the protocol stack of the transmitting device, a first RLC service data unit (SDU);
   constructing, at the RLC entity, a RLC protocol data unit (PDU) from the first RLC SDU;
   based on the upper layer indicating that the RLC entity should discard the first RLC SDU, determining, at the RLC entity, whether the first RLC SDU or at least one segment of the first RLC SDU is included in an RLC PDU which has been submitted to a Medium Access Control (MAC) layer of the protocol stack of the transmitting device;
   discarding, at the RLC entity, the first RLC SDU based on a determination that neither the first RLC SDU nor any segment of the first RLC SDU is included in an RLC PDU which has been submitted to the MAC layer of the protocol stack of the transmitting device; and
   not discarding, at the RLC entity, the first RLC SDU based on a determination that the first RLC SDU or at least one segment of the first RLC SDU is included in an RLC PDU which has been submitted to the MAC layer of the protocol stack of the transmitting device.

2. The method according to claim 1, wherein not discarding the first RLC SDU comprises:
   based on a determination that at least one segment of the first RLC SDU is included in an RLC PDU which has been submitted to the MAC layer:
   determining a remaining segment of the first RLC SDU that remains at the RLC entity; and
   submitting another RLC PDU, which includes the remaining segment of the first RLC SDU, to the MAC layer.

3. The method according to claim 1, further comprising:
   based on a determination that the first RLC SDU or at least one segment of the first RLC SDU is included in the RLC PDU which has been submitted to the MAC layer of the protocol stack of the transmitting device:
   transmitting, using a transceiver of the transmitting device, a data unit that comprises the RLC PDU which includes the first RLC SDU or at least one segment of the first RLC SDU.

4. The method according to claim 1, further comprising:
   based on discarding the first RLC SDU at the RLC entity:
   determining a plurality of discarded RLC SDUs, including the first RLC SDU, that have been discarded at the RLC entity;
   determining a plurality of remaining RLC SDUs that remain at the RLC entity;
   determining a plurality of first RLC sequence numbers (SNs) associated with the plurality of discarded RLC SDUs;
   determining a plurality of second RLC SNs associated with the plurality of remaining RLC SDUs; and
   re-associating the plurality of remaining RLC SDUs with a plurality of third RLC SNs consecutively, starting from a lowest RLC SN among the plurality of first RLC SNs that were associated with the plurality of discarded RLC SDUs.

5. A transmitting device configured to transmit data units in a wireless communication system, the transmitting device comprising:
   a transceiver;
   at least one processor; and
   at least one computer memory that is operably connectable to the at least one processor and that has stored thereon instructions which, when executed, cause the at least one processor to perform operations comprising:
   receiving, at a radio link control (RLC) entity of a protocol stack of the transmitting device from an upper layer of the protocol stack of the transmitting device, a first RLC service data unit (SDU);
   constructing, at the RLC entity, a RLC protocol data unit (PDU) from the first RLC SDU;
   based on the upper layer indicating that the RLC entity should discard the first RLC SDU, determining, at the RLC entity, whether the first RLC SDU or at least one segment of the first RLC SDU is included in an RLC PDU which has been submitted to a Medium Access Control (MAC) layer of the protocol stack of the transmitting device;
   discarding, at the RLC entity, the first RLC SDU based on a determination that neither the first RLC SDU nor any segment of the first RLC SDU is included in an RLC PDU which has been submitted to the MAC layer of the protocol stack of the transmitting device; and
   not discarding, at the RLC entity, the first RLC SDU based on a determination that the first RLC SDU or at least one segment of the first RLC SDU is included in an RLC PDU which has been submitted to the MAC layer of the protocol stack of the transmitting device.

6. The transmitting device according to claim 5, wherein not discarding the first RLC SDU comprises:
   based on a determination that at least one segment of the first RLC SDU is included in an RLC PDU which has been submitted to the MAC layer:
   determining a remaining segment of the first RLC SDU that remains at the RLC entity; and
   submitting another RLC PDU, which includes the remaining segment of the first RLC SDU, to the MAC layer of the protocol stack of the transmitting device.

7. The transmitting device according to claim 5, wherein the operations further comprises:
   based on a determination that the first RLC SDU or at least one segment of the first RLC SDU is included in the RLC PDU which has been submitted to the MAC layer of the protocol stack of the transmitting device:
   controlling the transceiver to transmit a data unit that comprises the RLC PDU which includes the first RLC SDU or at least one segment of the first RLC SDU.

8. The transmitting device according to claim 5, wherein the operations further comprise:
   based on discarding the first RLC SDU at the RLC entity:
   determining a plurality of discarded RLC SDUs, including the first RLC SDU, that have been discarded at the RLC entity;
   determining a plurality of remaining RLC SDUs that remain at the RLC entity;
   determining a plurality of first RLC sequence numbers (SNs) associated with the plurality of discarded RLC SDUs;
   determining a plurality of second RLC SNs associated with the plurality of remaining RLC SDUs; and
   re-associating the plurality of remaining RLC SDUs with a plurality of third RLC SNs consecutively, starting from a lowest RLC SN among the plurality of first RLC SNs that were associated with the plurality of discarded RLC SDUs.

9. The method according to claim 1, wherein the upper layer indicating that the RLC entity should discard the first RLC SDU comprises:
   generating a discard indication for the first RLC SDU at the upper layer based on an expiration of a timer; and
   submitting the discard indication from the upper layer to the RLC entity of the protocol stack.

10. The method according to claim 1,
wherein the upper layer of the protocol stack comprises a Packet Data Convergence Protocol (PDCP) layer of the protocol stack of the transmitting device.

11. The method according to claim 1,
wherein the transmitting device further comprises at least one computer memory that is configured to provide an RLC buffer that stores RLC SDUs, and
wherein discarding, at the RLC entity, the first RLC SDU comprises:
controlling the at least one computer memory to discard the first RLC SDU from the RLC buffer.

12. The method according to claim 4, further comprising:
submitting, to the MAC layer of the protocol stack, the plurality of remaining RLC SDUs that have been re-associated with the plurality of third RLC SNs.

13. The transmitting device according to claim 5, wherein the upper layer indicating that the RLC entity should discard the first RLC SDU comprises:
generating a discard indication for the first RLC SDU at the upper layer based on an expiration of a timer; and
submitting the discard indication from the upper layer to the RLC entity of the protocol stack.

14. The transmitting device according to claim 5,
wherein the upper layer of the protocol stack comprises a Packet Data Convergence Protocol (PDCP) layer of the protocol stack of the transmitting device.

15. The transmitting device according to claim 5,
wherein the at least one computer memory is further configured to provide an RLC buffer that stores RLC SDUs, and
wherein discarding, at the RLC entity, the first RLC SDU comprises:
controlling the at least one computer memory to discard the first RLC SDU from the RLC buffer.

16. The transmitting device according to claim 8, wherein the operations further comprise:
submitting, to the MAC layer of the protocol stack, the plurality of remaining RLC SDUs that have been re-associated with the plurality of third RLC SNs.

17. The method according to claim 1, wherein discarding the first RLC SDU at the RLC entity is performed so as not to introduce a gap in RLC sequence numbers (SNs) associated with RLC SDUs.

18. The transmitting device according to claim 5, wherein discarding the first RLC SDU at the RLC entity is performed so as not to introduce a gap in RLC sequence numbers (SNs) associated with RLC SDUs.

* * * * *